United States Patent [19]

Lagrange et al.

[11] 4,430,689
[45] Feb. 7, 1984

[54] DIELECTRIC CERAMIC COMPOSITIONS, CAPACITORS IN WHICH COMPOSITIONS OF THIS TYPE ARE EMPLOYED, AND A METHOD OF PRODUCTION OF SAID COMPOSITIONS

[75] Inventors: Alain Lagrange; Alain Beauger, both of Bagnolet, France

[73] Assignee: L.C.C.-C.I.C.E. Compagnie Europeenne de Composants Electroniques, Bagnolet, France

[21] Appl. No.: 357,896

[22] Filed: Mar. 15, 1982

[30] Foreign Application Priority Data

Mar. 18, 1981 [FR] France ................................ 81 05403

[51] Int. Cl.$^3$ ............................................. H01G 4/12
[52] U.S. Cl. .................................... 361/321; 252/520; 252/521; 428/472; 428/689; 501/137
[58] Field of Search ................ 501/137; 252/520, 521, 252/63.5; 361/321; 428/472, 689

[56] References Cited

U.S. PATENT DOCUMENTS

| | | | |
|---|---|---|---|
| 3,912,527 | 10/1975 | Utsumi et al. | 252/520 |
| 4,082,906 | 4/1978 | Amin et al. | 501/137 |
| 4,192,840 | 3/1980 | Schmelz | 252/520 |

*Primary Examiner*—George F. Lesmes
*Assistant Examiner*—E. Rollins Buffalow
*Attorney, Agent, or Firm*—Oblon, Fisher, Spivak, McClelland & Maier

[57] ABSTRACT

Dielectric ceramic compositions of the ferroelectric type, especially for the fabrication of multilayer ceramic capacitors having improved properties, contain 90% to 98.5% by weight of barium titanate and 1.5% to 10% by weight of lithium fluoride, in which the barium titanate corresponds to the following formula:

$BaTiO_3$ with a molar ratio $TiO_2/BaO$ which is lower than 1.

6 Claims, No Drawings

DIELECTRIC CERAMIC COMPOSITIONS, CAPACITORS IN WHICH COMPOSITIONS OF THIS TYPE ARE EMPLOYED, AND A METHOD OF PRODUCTION OF SAID COMPOSITIONS

This invention relates to dielectric ceramic compositions of the ferroelectric type, to capacitors in which compositions of this type are employed, and to a method of production of said compositions.

By reason of their very high dielectric constant, ceramic compositions of this type are particularly well-known in applications relating to the fabrication of capacitors. By way of example, ceramic compositions which are well-known to those versed in the art are described in U.S. Pat. Nos. 2,402,518, 2,443,211, 3,529,978 and 3,612,963. As a general rule, these ceramic compositions are sintered in air or in a reducing atmosphere at temperatures in the vicinity of 1200 to 1400 degrees centigrade. In particular, when fabricating capacitors of the multilayer type, for example, the metal electrodes of these capacitors are naturally deposited on the ceramic material prior to sintering. In consequence, this entails the need to employ electrodes of precious metals such as platinum, palladium, gold or their alloys. These electrodes are usually deposited by the silk-screen process. Apart from the high cost of the electrodes of said capacitors, it is important to ensure that the materials employed do not give rise to any interaction with the ceramic material during the sintering process and to ensure that no discontinuity takes place within the electrodes. As the sintering temperature becomes higher, however, so the probability of appearance of such defects becomes greater.

More recently, U.S. Pat. No. 4,082,906 described a multilayer ceramic capacitor which has a ceramic layer coating composed of at least 50% barium titanate and 0.25% to 10% lithium fluoride. A composition of this type has the advantage on the one hand of being sinterable or in other words capable of producing a substance of higher density after a firing operation than was the case prior to firing and, on the other hand, of attaining a distinctly lower sintering temperature than previously known ceramic compositions, this temperature being within the range of 750° C. to 1250° C. It is also worthy of note that the properties of such compositions were already known, as disclosed in particular in the article entitled "Densification and strength of BaTiO3 with LiF and MgO additives" published in the American Ceramic Society Bulletin—1976, volume 55, No 3, pages 273 to 285. Compositions of this type normally make use of barium titanates which are substantially stoichiometric or in other words contain substantially the same number of barium ions and titanium ions.

It is in fact known, however, that ceramic compositions having a base of barium titanate do not normally call for the use of this substance in stoichiometric form. In fact, those versed in the art know that the sintering temperature of barium titanate usually tends to decrease when adding a slight excess of titanium ions with respect to the barium ions, the proportions being as a general rule of the order of 2%. Conversely, it is well known that a reduction of the number of titanium ions with respect to the number of barium ions in barium titanate usually results in an increase in the sintering temperature. (By sintering temperature is meant the temperature or temperature range which results in maximum densification of the product).

Compositions such as those described in the foregoing and containing a slight excess of titanium ions with respect to the barium ions make it possible to obtain dielectric ceramics which are wholly suited for use in the fabrication of capacitors and in particular multilayer ceramic capacitors.

Taking into account the prior art which has been set forth in the foregoing, studies pursued by the present Applicant have led to the completely unexpected finding of novel ceramic compositions having a base of barium titanate and lithium fluoride and having improved properties in comparison with those of compositions known up to the present time while retaining a low sintering temperature.

According to the invention, these compositions are distinguished by the fact that they contain 90% to 98.5% by weight of barium titanate and 1.5% to 10% by weight of lithium fluoride in which the barium titanate corresponds to the formula:

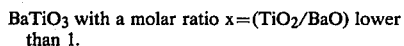

$BaTiO_3$ with a molar ratio $x = (TiO_2/BaO)$ lower than 1.

In a preferential embodiment, the compositions according to the invention are distinguished by the fact that x is lower than 0.99 and preferably within the range of 0.98 to 0.97.

It has in fact been found in a completely surprising manner that, although the compositions described in the foregoing have a titanium ion deficiency with respect to the number of barium ions, such compositions not only permitted sintering at a very low temperature of the order of 900° C. but also exhibited wholly exceptional electrical properties compared with compositions containing an excess number of titanium ions. In particular, when x is within the range of 0.97 to 0.98, these electrical properties are quite exceptional.

Furthermore, the time which is necessary to sinter these compositions at a temperature of the order of 900° C. and to obtain the results announced in the foregoing is very much shorter than the time usually required for similar compositions.

Preference will be given to the use of a weight concentration of lithium fluoride in the compositions of the invention which vary between 2 and 5%.

Moreover, taking into account the properties of sintering time and temperature of the method mentioned above, multilayer capacitors fabricated by means of the compositions according to the invention make it possible to employ electrodes containing a very high proportion of silver or even permit the use of pure silver, which also results in substantial capital economy.

As a general rule, the compositions according to the invention will be obtained from a mixture of barium titanate and lithium fluoride as defined in the foregoing, in which there are added an acrylic binder as well as a plasticizer if necessary. The mixing operation is performed in a solvent selected from the ketones, alcohols, trichloroethylene, benzene and its alkylated derivatives. Preference will be given to the use of trichloroethylene, toluene, xylene, acetone or methyl ethyl ketone.

A better understanding of the invention will be gained from the following examples of application which are given without any implied limitation:

EXAMPLES 1 TO 6

There are introduced in a ball mill 98 grams of barium titanate having variable stoichiometry, 2 grams of lithium fluoride, 150 cm³ of alcohol, and 200 grams of balls. Mixing is performed over a period of 15 hours at room temperature. When the balls have been removed, the slurry thus obtained is dried, screened, and mixed with 130 grams of a 3% latex solution. There is thus obtained a paste which is shaped so as to form disks having a diameter of 8.3 millimeters and a thickness of 0.5 millimeter. Each face of said disks is coated with a silver electrode approximately 10 microns in thickness. Approximately twenty disks of the type described in the foregoing were fabricated in respect of each value of stoichiometry indicated in the table below. All these disks containing barium titanate of variable stoichiometry were introduced simultaneously into a sintering furnace. The entire batch of disks was sintered to a temperature of 900° C. for a period of 90 minutes. The results obtained are mentioned in Table I given hereunder:

TABLE I

| | EXAMPLE No | | | | | |
|---|---|---|---|---|---|---|
| | 1 | 2 | 3 | 4 | 5 | 6 |
| $TiO_2/BaO$ | 0.94 | 0.97 | 0.98 | 1 | 1.02 | 1.03 |
| $d(g/cm^3)$ | 5.15 | 5.50 | 5.43 | 4.11 | 3.48 | 3.48 |
| $\epsilon 20$ | 1363 | 5284 | 5507 | 2482 | 1160 | 1258 |
| $tg\delta 20 \times 10^4$ | 400 | 32 | 70 | 460 | 240 | 224 |
| RI(100 V) (GΩ) | 240 | 1000 | 600 | 500 | 35 | 30 |
| $\Delta C/C$ as a function of temperature | | | | | | |
| −30° | −2% | −15% | −32% | −52% | −35% | −38% |
| +85° | −14% | −58% | −55% | +18% | +7% | +9% |

In this table, d indicates the density of the material obtained after sintering, $\epsilon$ is the dielectric constant of the material, the tangent $\delta$ is the tangent of the loss angle, RI is the insulation resistance of the capacitor as measured at 100 volts and expressed in gigohms whilst the last two lines give the variation in capacitance of the capacitor as a function of temperature, at −30° C. and +85° C. The measurements were performed at 20° C. and electrical measurements were performed by means of a signal having a frequency of 1 KHz.

It will be noted that, in the case of a ratio $TiO_2/BaO$ within the range of 0.97 to 0.98, the results obtained are excellent.

EXAMPLES 7 TO 12

Disks are prepared in the same manner as before and under the same conditions, the sintering operation being performed at a temperature of 930° C. during the same period of time. All other things being equal, the results obtained are mentioned in Table II as follows:

TABLE II

| | EXAMPLE No | | | | | |
|---|---|---|---|---|---|---|
| | 7 | 8 | 9 | 10 | 11 | 12 |
| $TiO_2/BaO$ | 0.94 | 0.97 | 0.98 | 1 | 1.02 | 1.03 |
| $d(g/cm^3)$ | 5.05 | 5.60 | 5.65 | 4.90 | 3.60 | 4.01 |
| $\epsilon 20$ | 1213 | 4957 | 5484 | 3688 | 2167 | 3158 |
| $tg\delta 20 \times 10^4$ | 1450 | 70 | 139 | 319 | 606 | 390 |
| RI(100V)GΩ | 24 | 1300 | 600 | 26 | 40 | 19 |
| Variation of $\Delta C/C$ as a function of temperature | | | | | | |
| −30 | −16% | −15% | −40% | −48% | −42% | −45% |
| +85 | −14% | −50% | −40% | +10% | +42% | +50% |

As in the case of the preceding examples, it is found that the results obtained in respect of a ratio $TiO_2/BaO$ varying between 0.97 and 0.98 are particularly excellent.

EXAMPLES 13 AND 14

This example shows the influence of the method of preparation on the results of the ceramic composition obtained. As in the case of examples 1 to 6, samples are prepared in order to form disks which are then metallized. All the parameters are identical with those of the previous examples 1 to 6 except, however, for the following modifications: the ratio $TiO_2/BaO$ is equal to 0.97 and the sintering temperature is 930° C. for a period of 90 minutes. The results obtained are summarized in Table III as follows:

TABLE III

| | EXAMPLE No | |
|---|---|---|
| | 13 Preparation with water | 14 Preparation with alcohol |
| $d(g/cm^3)$ | 4.60 | 5.44 |
| $\epsilon 20$ | 2252 | 4957 |
| $tg\delta \times 10^4$ | 540 | 70 |
| RI(100V) (GΩ) | 2 | 1300 |
| Variation of $\Delta C/C$ as a function of temperature | | |
| −30° | −40% | −15% |
| +85° | +28% | −50% |
| Tc | +90° | +10° |

The symbols appearing in this table have the same meanings as in the previous tables. In this table, Tc designates the Curie temperature of the ceramic material obtained. In the case of Example 13, the same quantity in volume of water has been employed as in Example 14 in which alcohol is employed. As stated earlier, this quantity is 150 cm³. It is very important to note in this table that the use of an organic solvent instead of water for the purpose of forming the slurry produces much better results.

EXAMPLE 15

This example relates to the fabrication of a multilayer capacitor composed of twenty active dielectric layers and constructed in accordance with a well-known technique as described, for example, in U.S. Pat. No. 4,082,906. The preparation of the dielectric composition is carried out as in the case of Examples 1 to 6; however, the ratio $TiO_2/BaO$ is equal to 0.98 and the sintering temperature is 930° C. for a period of 90 minutes. There is employed 1 kilogram of the mixture of $BaTiO_3$ and LiF as described earlier, to which are added 675 g of trichloroethylene, 460 g of an organic solution containing 20% of an acrylic binder and 15 g of plasticizer having a base of dibutylphtalate. The entire quantity is mixed in a ball mill for a period of 15 hours. The slurry thus obtained is then poured onto a substrate. The thickness of dielectric deposited prior to sintering is 38 microns and the thickness of each dielectric layer after sintering is about 30 microns. The multilayer capacitor thus formed consists of alternate layers of twenty dielectric film layers as defined in the foregoing and of metallic ink deposited by means of a silk screen based on a mixture of 10% by weight of palladium and 90% by weight of silver. As is the customary practice in this technique, the surface electrodes are of course covered by a certain number of dielectric layers as defined in the foregoing. These layers are inactive during operation of the capacitor but have the function of protecting this latter. The conditions of sintering of the capacitor are those which have been defined in the foregoing. The results obtained are given in Table IV as follows:

TABLE IV

|  | EXAMPLE No 15 |
| --- | --- |
| Capacity | 289 nF |
| $\epsilon 20$ | 9000 |
| $tg\delta \times 10^4$ | 140 |
| RI(100V) | 90 G$\Omega$ |
| Variation $\Delta C/C$ as a function of temperature |  |
| $-30°$ | $-45\%$ |
| $+85°$ | $-59\%$ |
| Tc | $+25°$ C. |

It should be noted that, in this table, the tangent of the loss angle has been measured at 1 effective volt at 1 KHz.

It is therefore apparent that the results obtained in the case of capacitors of the disk type are also obtained in the case of multilayer capacitors. These latter have the same unexpected properties as the disk capacitors tested earlier.

EXAMPLES 16 TO 22

The examples given below show the influence exerted by the variation in the proportion of lithium fluoride and therefore of barium titanate in the composition according to the invention. The ceramic compositions are prepared as in the case of Examples 1 to 6 with a ratio $TiO_2/BaO$ equal to 0.97 and a sintering temperature of 930° C. As was the case with all the preceding examples except for Example 15, electrical tests are performed on disk-type capacitors. The results obtained are recorded in the following table:

TABLE V

|  | EXAMPLE No | | | | | | |
| --- | --- | --- | --- | --- | --- | --- | --- |
|  | 16 | 17 | 18 | 19 | 20 | 21 | 22 |
| % LiF | 0.5 | 1 | 1.5 | 2 | 3 | 5 | 10 |
| $d(g/cm^3)$ | 3.89 | 3.93 | 4.71 | 5.60 | 5.58 | 5.49 | 4.96 |
| $\epsilon 20$ | 1229 | 1123 | 2262 | 4957 | 6548 | 5909 | 2104 |
| $tg\delta\ 10^4$ | 180 | 128 | 180 | 70 | 40 | 45 | 218 |
| RI(100V)G$\Omega$ | 0.7 | 0.15 | 3.5 | 1300 | 700 | 450 | 30 |
| Variation of $\Delta C/C$ as a function of temperature | | | | | | | |
| $-30°$ | $-20\%$ | $-15\%$ | $-15\%$ | $-15\%$ | $-27\%$ | $-20\%$ | $-28\%$ |
| $+85°$ | $+4\%$ | 0 | $-15\%$ | $-50\%$ | $-60\%$ | $-62\%$ | $-36\%$ |

As can be noted in Table V given above, the best results are obtained in respect of a percentage of lithium fluoride which varies between 1.5 and 10% by weight with respect to the weight of the total composition; these results are even further improved, however, between 2 and 5% by weight.

The results indicated in this table show that a concentration of the order of 3% of lithium fluoride provides the most satisfactory compromise in the case of fabrication of a capacitor.

What is claimed is:

1. A multilayer ceramic capacitor comprising a plurality of electrodes of an electrically conducting material including a major proportion of silver, said electrodes being separated by a plurality of ceramic dielectric layers, two successive electrodes being separated by at least one dielectric layer, the electrodes of even-numbered rows and odd-numbered rows being respectively connected together electrically, wherein the ceramic composition is a dielectric ceramic composition having a high dielectric constant, wherein said composition contains 90% to 98.5% by weight of barium titanate and 1.5% to 10% by weight of lithium fluoride, in which the barium titanate corresponds to the formula:

$BaTiO_3$ with a molar ratio x=$(TiO_2/BaO)$, wherein x is higher than or equal to 0.97 and lower than or equal to 0.98.

2. A multilayer ceramic capacitor according to claim 1, wherein said dielectric ceramic composition contains 2 to 5% by weight of lithium fluoride.

3. A multilayer ceramic capacitor according to claim 2, wherein said composition contains approximately 3% by weight of lithium fluoride.

4. A multilayer ceramic capacitor according to claim 1, wherein said electrically conducting material comprises 90% silver and 10% palladium.

5. A multilayer ceramic capacitor according to claim 1, wherein said electrically conducting material consists essentially of silver.

6. A multilayer ceramic capacitor according to claim 2, wherein the dielectric constant of the ceramic composition is about 5000 or higher.

* * * * *